(12) United States Patent
DePue et al.

(10) Patent No.: US 7,192,074 B2
(45) Date of Patent: Mar. 20, 2007

(54) AUTOMOTIVE COMPARTMENT HAVING AN INTEGRATED SPRING MECHANISM AND METHOD OF MAKING THE SAME

(75) Inventors: Todd L DePue, Brighton, MI (US); David Dooley, Troy, MI (US); Randy S Reed, Fair Haven, MI (US); Glenn A Cowelchuk, Chesterfield Township, MI (US); Michael J Hier, Milford, MI (US)

(73) Assignee: Lear Corporation, Southfield, MI (US)

( * ) Notice: Subject to any disclaimer, the term of this patent is extended or adjusted under 35 U.S.C. 154(b) by 292 days.

(21) Appl. No.: 10/904,433

(22) Filed: Nov. 10, 2004

(65) Prior Publication Data

US 2006/0097536 A1    May 11, 2006

(51) Int. Cl.
    *B60N 3/12*   (2006.01)
(52) U.S. Cl. ............... 296/37.9; 296/146.7; 296/37.13
(58) Field of Classification Search ............. 296/146.7, 296/37.5, 37.8, 7.9, 37.12, 37.13, 37.7; 16/225, 16/277, 278, 280, 286, 289, 291, 293
    See application file for complete search history.

(56) References Cited

U.S. PATENT DOCUMENTS

| | | | |
|---|---|---|---|
| 3,400,979 A | 9/1968 | James | ........................ 297/412 |
| 3,833,964 A * | 9/1974 | Harcourt | ...................... 16/291 |
| 4,124,308 A | 11/1978 | Sokolow | |
| 4,330,584 A | 5/1982 | Doerer | |
| 4,470,936 A | 9/1984 | Potter | |
| 4,766,025 A | 8/1988 | Sanok et al. | |
| 4,781,956 A | 11/1988 | Zimmermann et al. | ....... 428/43 |
| 4,783,114 A | 11/1988 | Welch | |

(Continued)

FOREIGN PATENT DOCUMENTS

DE          19934249          7/1999

(Continued)

OTHER PUBLICATIONS

Gregory A. Blankenship (EXAMINER). Office Action, dated as mailed on May 19, 2006 for U.S. Appl. No. 10/904,015, 21 pages, USPTO.

(Continued)

*Primary Examiner*—Jason Morrow
(74) *Attorney, Agent, or Firm*—Wood, Herron & Evans, L.L.P.

(57) ABSTRACT

An automotive assembly having an integrated spring mechanism. The assembly includes a first member and a second member pivotally coupled to the first member and moveable between a first and second position with respect to the first member. The assembly further includes a resilient element integrally molded with one of the first and second members. The resilient element includes an extension portion having a free end that is coupled to the other one of the first and second members. The extension portion imposes a force on the second member to bias the second member in at least one direction. A method of making the assembly includes a two shot molding process where the one of the first and second members is formed in a first shot of the molding operation and the resilient element is integrally molded thereto in the second shot of the molding operation.

20 Claims, 4 Drawing Sheets

U.S. PATENT DOCUMENTS

| | | | |
|---|---|---|---|
| 4,810,452 A | 3/1989 | Taillefert et al. ............. 264/247 |
| 4,958,883 A | 9/1990 | Iwaki et al. |
| 5,002,307 A | 3/1991 | Heidorn |
| 5,040,335 A | 8/1991 | Grimes ......................... 49/502 |
| 5,071,605 A | 12/1991 | Kawaguchi et al. ........ 264/45.2 |
| 5,073,318 A | 12/1991 | Rohrlach et al. ........... 264/46.5 |
| 5,096,221 A | 3/1992 | Combs et al. |
| 5,224,299 A | 7/1993 | Abe ............... 49/502 |
| 5,297,842 A | 3/1994 | Hayashi |
| 5,387,390 A | 2/1995 | Kornylo ..................... 264/46.8 |
| 5,395,135 A | 3/1995 | Lim et al. |
| 5,407,225 A | 4/1995 | Cooper |
| 5,445,430 A | 8/1995 | Nichols ...................... 296/153 |
| 5,474,841 A | 12/1995 | Matsuki et al. ........... 428/304.4 |
| 5,484,561 A | 1/1996 | Weber et al. |
| 5,527,084 A | 6/1996 | Scherf |
| 5,536,351 A | 7/1996 | Rheinlander et al. ........ 156/212 |
| 5,571,597 A | 11/1996 | Gallagher et al. ........... 428/152 |
| 5,573,617 A | 11/1996 | Franck et al. ............... 156/196 |
| 5,590,901 A | 1/1997 | MacGregor ............. 280/728.3 |
| 5,591,078 A | 1/1997 | Filion et al. |
| 5,626,382 A | 5/1997 | Johnson et al. |
| 5,663,210 A | 9/1997 | Sugimoto et al. ............. 521/81 |
| 5,679,296 A | 10/1997 | Kelman et al. |
| 5,692,711 A | 12/1997 | Tucker ....................... 248/118 |
| 5,709,925 A | 1/1998 | Spengler et al. ............ 428/198 |
| 5,715,966 A | 2/1998 | Nagano et al. .............. 220/339 |
| 5,779,262 A | 7/1998 | Totani et al. |
| 5,783,293 A | 7/1998 | Lammi |
| 5,792,413 A | 8/1998 | Ang et al. .................... 264/515 |
| 5,799,385 A | 9/1998 | Vecchiarino et al. .......... 29/469 |
| 5,803,415 A | 9/1998 | Konishi et al. ................. 248/18 |
| 5,810,388 A | 9/1998 | Berardi et al. ........... 280/728.3 |
| 5,816,609 A | 10/1998 | Gray et al. ............... 280/728.3 |
| 5,904,370 A | 5/1999 | Steiner et al. |
| 5,934,730 A | 8/1999 | Yagishita et al. |
| 5,941,557 A | 8/1999 | Mullins, Jr. et al. |
| 5,951,094 A | 9/1999 | Konishi et al. ............. 296/153 |
| 5,976,289 A | 11/1999 | Kawakubo et al. ............ 156/78 |
| 5,995,380 A | 11/1999 | Maue et al. ................ 361/826 |
| 6,003,716 A | 12/1999 | Allison et al. .............. 220/326 |
| 6,012,735 A | 1/2000 | Gray et al. ............... 280/728.2 |
| 6,013,210 A | 1/2000 | Gardner, Jr. ................ 264/40.1 |
| 6,017,617 A | 1/2000 | Gardner, Jr. ............... 428/309.9 |
| 6,070,905 A | 6/2000 | Renault |
| 6,116,672 A * | 9/2000 | Cannon et al. ........... 296/37.13 |
| 6,136,415 A | 10/2000 | Spengler |
| 6,149,853 A | 11/2000 | Luckett et al. ............. 264/266 |
| 6,168,188 B1 | 1/2001 | Preisler et al. ........... 280/728.3 |
| 6,186,582 B1 | 2/2001 | Beckmann |
| 6,210,613 B1 | 4/2001 | Stein et al. ................ 264/45.4 |
| 6,214,157 B1 | 4/2001 | Spengler ................. 156/304.6 |
| 6,217,098 B1 | 4/2001 | O'Brien et al. ............... 296/70 |
| 6,248,200 B1 | 6/2001 | Dailey et al. |
| 6,251,326 B1 | 6/2001 | Siano et al. ............. 264/328.8 |
| 6,267,918 B1 | 7/2001 | Bauer |
| 6,308,488 B1 | 10/2001 | Hoshino |
| 6,319,438 B1 | 11/2001 | Smith et al. .................. 264/75 |
| 6,364,351 B1 | 4/2002 | Hier et al. .................. 280/732 |
| 6,368,093 B1 | 4/2002 | Vecchiarino et al. |
| 6,391,232 B1 | 5/2002 | Fritsch ...................... 264/46.6 |
| 6,402,189 B1 | 6/2002 | Gray et al. |
| 6,409,947 B1 | 6/2002 | Wandyez |
| 6,431,600 B1 | 8/2002 | Freisler et al. |
| 6,433,728 B1 | 8/2002 | Krupp et al. ................ 341/176 |
| 6,453,535 B1 | 9/2002 | Nicholas |
| 6,474,724 B2 | 11/2002 | Lemmon et al. ............ 296/189 |
| 6,485,072 B1 | 11/2002 | Werner et al. |
| 6,517,144 B2 | 2/2003 | Kobayashi |
| 6,544,449 B1 | 4/2003 | Gardner |
| 6,554,350 B2 | 4/2003 | Takahara |
| 6,568,707 B2 | 5/2003 | Hier et al. .................. 280/732 |
| 6,627,134 B2 | 9/2003 | Thomson |
| 6,644,727 B2 | 11/2003 | Audibert et al. |
| 6,652,793 B2 | 11/2003 | Corrion et al. ............. 264/242 |
| 6,657,158 B1 | 12/2003 | Skelly et al. |
| 6,688,640 B1 | 2/2004 | Davis, Jr. et al. ......... 280/728.3 |
| 6,706,365 B2 | 3/2004 | Akasaka et al. |
| 6,708,462 B2 | 3/2004 | Pokorzynski et al. |
| 6,740,390 B2 | 5/2004 | Randazzo .................. 428/122 |
| 6,742,830 B2 | 6/2004 | Zimmerman et al. |
| 6,746,067 B2 * | 6/2004 | Schmidt et al. .......... 296/37.13 |
| 6,749,794 B2 | 6/2004 | Spengler |
| 6,756,004 B2 | 6/2004 | Davis, Jr. et al. ........... 264/255 |
| 6,758,510 B1 | 7/2004 | Starling .................... 296/39.1 |
| 6,761,388 B2 | 7/2004 | Lein et al. ................ 296/24.34 |
| 6,764,633 B2 | 7/2004 | Takahashi et al. .......... 264/259 |
| 6,793,181 B1 | 9/2004 | Hallock |
| 6,837,544 B2 | 1/2005 | Bomchen et al. |
| 6,899,363 B2 | 5/2005 | Dry |
| 6,899,373 B2 | 5/2005 | Kim |
| 6,929,309 B1 | 8/2005 | Radu et al. |
| 6,955,392 B2 | 10/2005 | Dry |
| 6,983,967 B2 | 1/2006 | Scheidmantal et al. |
| 6,991,841 B2 | 1/2006 | Cowelchuk et al. |
| 2001/0030436 A1 | 10/2001 | Kifer et al. ................ 296/24.1 |
| 2001/0047899 A1 | 12/2001 | Ikeda .......................... 180/90 |
| 2002/0041912 A1 | 4/2002 | Thomson |
| 2002/0043861 A1 | 4/2002 | Meadows .............. 297/411.21 |
| 2002/0066972 A1 | 6/2002 | Fritsch ...................... 264/46.4 |
| 2002/0079603 A1 | 6/2002 | Bemis et al. |
| 2002/0153741 A1 | 10/2002 | Speelman et al. ............. 296/70 |
| 2002/0195844 A1 | 12/2002 | Hipwell ..................... 296/214 |
| 2003/0011214 A1 | 1/2003 | Gupte et al. ................ 296/214 |
| 2003/0057739 A1 | 3/2003 | Lutz et al. .................. 296/214 |
| 2003/0071039 A1 * | 4/2003 | Spykerman et al. ............ 220/6 |
| 2003/0075833 A1 | 4/2003 | Thomson |
| 2003/0121877 A1 * | 7/2003 | Brozell et al. .............. 215/220 |
| 2003/0155787 A1 | 8/2003 | Lein et al. ................. 296/24.1 |
| 2003/0184064 A1 | 10/2003 | Hier et al. .................. 280/732 |
| 2003/0184108 A1 | 10/2003 | Donovan et al. ........... 296/24.1 |
| 2003/0209888 A1 | 11/2003 | Davis, Jr. et al. ......... 280/728.3 |
| 2003/0209892 A1 | 11/2003 | Hier et al. .................. 280/732 |
| 2004/0017023 A1 | 1/2004 | Schoemann et al. ........ 264/245 |
| 2004/0032055 A1 | 2/2004 | Cavallaro et al. |
| 2004/0119267 A1 | 6/2004 | Cowelchuck et al. .... 280/728.3 |
| 2004/0119268 A1 | 6/2004 | Davis, Jr. et al. ......... 280/728.3 |
| 2004/0130051 A1 | 7/2004 | Cowelchok et al. ....... 264/46.4 |
| 2005/0046075 A1 | 3/2005 | Youngs et al. |
| 2005/0183239 A1 * | 8/2005 | Chen .......................... 16/286 |
| 2005/0194806 A1 | 9/2005 | Cowelchuk et al. |
| 2005/0258569 A1 | 11/2005 | Schoemann et al. |

FOREIGN PATENT DOCUMENTS

| | | |
|---|---|---|
| DE | 10123207 | 5/2001 |
| DE | 10104036 | 8/2001 |
| EP | 0408202 | 1/1991 |
| EP | 0410553 | 1/1991 |
| EP | 0749872 | 3/2000 |
| EP | 1086863 | 3/2001 |
| EP | 1182024 | 2/2002 |
| EP | 1580077 | 9/2005 |
| FR | 2771356 | 11/1997 |
| FR | 2796610 | 1/2001 |
| GB | 2403683 | 1/2005 |
| JP | 5237871 | 9/1993 |
| JP | 8011145 | 1/1996 |
| JP | 8026054 | 1/1996 |
| JP | 8183059 | 7/1996 |
| JP | 10291431 | 11/1998 |
| JP | 11070604 | 3/1999 |
| JP | 11123999 | 5/1999 |
| JP | 11291288 | 10/1999 |

| JP | 2000016216 | 1/2000 |
| JP | 2003103676 | 4/2003 |
| JP | 2003266476 | 9/2003 |
| JP | 2005119404 | 5/2005 |
| WO | 01/25055 | 4/2001 |

OTHER PUBLICATIONS

Lawrence Emile Lambelet (EXAMINER), Office Action, dated as mailed on May 17, 2006 for U.S. Appl. No. 10/708,312, 39 pages, USPTO.

Examiner Haydn Gupwell, *Combined Search and Examination Report under Sections 17 and 18(3)*, The UK Patent Office.

Mekas et al., *Automotive Interior Trim Assembly With Soft Feel*, U.S. Patent Application Publication No. 2005/0186388.

Examiner Peter Gardiner, *Combined Search and Examination Report Under Sections 17 and 18(3)*, The UK Patent Office.

Examiner Monty Siddique, *Combined Search and Examination Report Under Sections 17 and 18(3)*, The UK Patent Office.

Totani et al., *Interior Finish Member For An Automobile With An Air Bag Device*, U.S. Patent Application Publication No. 2003/0209890.

Cowelchok et al., *Integrated Trim Plate With A Thermoplastic Cover*, U.S. Patent Application Publication No. 2004/0130051.

Hayashi et al., *Molded Laminate And Method For Producing The Same*, U.S. Patent Application Publication No. 2004/0202824.

DePue, *Two-Shot Co-Injected Automotive Interior Trim Assembly And Method*, U.S. Patent Application Publication No. 2005/013897.

Examiner D. Glenn Dayoan, *Office Action*, dated as mailed on Mar. 1, 2006.

Examiner D. Glenn Dayoan, *Office Action*, dated as being mailed on Mar. 14, 2006 in U.S. Appl. No. 10/904,007.

Examiner Kiran B. Patel, *Notice of Allowance*, dated as being mailed on Mar. 24, 2006, in U.S. Appl.No. 10/904,409.

* cited by examiner

AUTOMOTIVE COMPARTMENT HAVING AN INTEGRATED SPRING MECHANISM AND METHOD OF MAKING THE SAME

CROSS-REFERENCE

The present invention is related to U.S. Ser. No. 10/708,312, filed Feb. 24, 2004, U.S. Ser. No. 10/711,692, filed Sep. 30, 2004, U.S. Ser. No. 10/904,007 filed Oct. 19, 2004, U.S. Ser. No. 10/904,008, filed Oct. 19, 2004, U.S. Ser. No. 10/904,010 filed Oct. 19,2004. U.S. Ser. No. 10/904,011 filed Oct. 19, 2004, U.S. Ser. No. 10/904,015 filed Oct. 19, 2004, U.S. Ser. No.10/904,032 filed Oct. 20, 2004, U.S. Ser. No. 10/904,033 filed Oct. 20, 2004, U.S. Ser. No. 10/904,407 filed Nov. 9, 2004, U.S. Ser. No. 10/904,408 filed Nov. 9, 2004 and U.S. Ser. No. 10/904,409 filed Nov. 9, 2004.

FIELD OF THE INVENTION

The present invention pertains generally to automotive interiors and more particularly to compartments for automotive interiors.

BACKGROUND OF THE INVENTION

It is known to provide automotive interiors with various trim assemblies to improve the aesthetic appearance of the automotive interior and for the comfort and convenience of vehicle occupants. Examples of these interior trim assemblies include the instrument panels, armrests, door trim panels and consoles. In many of these trim assemblies, various compartments are incorporated therein that allow the vehicle occupant to conveniently store one or more items, such as tissue, coins, maps, cigarette ashes and other items typically carried in a vehicle. In many cases, such as for storage compartments or ashtrays in door panels or rear interior side panels, it is desirable for the compartment to include a door or cover that overlies the opening and secures the items within the compartment. The cover is typically attached to the compartment and moveable, such as by a hinge mechanism, so that the articles in the compartment may be accessed.

Moreover, when dealing with hinged assemblies in automobiles, such as that between a cover and a compartment body in, for example, automotive storage compartments or ashtrays, it is desirable to provide an over-center spring mechanism to aid in opening and closing the cover so as to provide a snap open/snap close feature. Additionally, it is desirable to provide a mechanism that will keep the cover in an open position or a closed position. In this way, when a vehicle occupant is accessing the compartment, the occupant does not have to hold the cover in an open position, and when the cover is in a closed position, the cover does not pop open or rattle when the automobile hits a bump or is traveling on a rough road.

In many previous automotive compartments, a spring mechanism is used to provide some resistance to movement of the cover from the open or closed position as well as to provide the over-center feature. For instance, manufactures typically use a coil spring, or a pair of coil springs, with one end coupled to the compartment body and the other end coupled to the cover. The springs are configured such that when the cover is in the closed position, the springs apply a force that biases the cover toward the compartment body and in the closed position. The springs are further configured such that as an occupant moves the cover toward the open position there is an equilibrium position of the cover between the open and closed positions such that a slight movement of the cover away from the equilibrium position and toward the open position causes a spring force that biases the cover toward the open position. The springs are further configured such that a slight movement of the cover away from the equilibrium position and toward the closed position causes a spring force that biases the cover toward the closed position. In this way, the cover will either snap open or snap closed once it is moved away from the equilibrium position. Once in the open position, the spring applies a force that biases the cover away from the compartment body and in the open position.

Previous automotive compartments also include other features. For instance, the compartment body may include a soft material placed therein so as to prevent items placed in the compartment from rattling or moving during operation of the automobile. To this end, the compartment body interior may include a rubber mat or flock material. Additionally, the cover may include a decorative outer skin such as a vinyl, cloth, or leather skin to provide an aesthetic aspect to the compartment. A foam layer may be further provided beneath the skin so give the cover a soft feel. In this way, for example, the compartment can be additionally utilized as an armrest.

Automotive compartments having the above-described configuration have some drawbacks. A primary drawback is in the manufacturing and assembly of the various parts that make up the compartment. The current process for making a compartment is typically to form the compartment body in a first mold. The compartment cover is then individually formed in a second and separate mold. A further separate connecting member, usually being a pair of metal or plastic cylindrical hinge pins, is then used to couple the cover to the compartment body. The coil springs are then attached to the cover and compartment body. The soft material in the interior of the compartment body may be added in a separate processing step. If so desired, a separate processing step may also be used to add the skin and foam to the cover.

Thus, under current manufacturing processes, compartments comprise numerous parts each having different part numbers that must all be appropriately supplied, tracked, shipped, inventoried and eventually assembled to make the complete product. Multiple part assemblies in turn lead to significant administrative costs and labor costs, which increase the overall costs of production.

There is a need for an improved automotive compartment and a method for making the same that reduces the number of parts and reduces the labor required for assembly thereof, thereby reducing overall manufacturing costs.

SUMMARY OF THE INVENTION

The present invention provides for an improved automotive assembly with an integrated spring mechanism having a reduced number of parts and that is adapted to be coupled to an interior of a vehicle. To this end, the automotive assembly includes a first member and a second member pivotally coupled to the first member. The second member is moveable between a first and second position with respect to the first member. A resilient element made from a polymer material is integrally molded with one of the first member or the second member. The resilient element includes an extension portion that has a free end that is coupled to the other of the first member or the second member. The extension portion imposes a force on the second member that biases the second member in at least one direction.

In one embodiment of the invention, the first member is a compartment body defining a cavity adapted to store various items therein and includes an opening for gaining access to the cavity. The second member is a cover and moveable between an open position wherein the cavity is accessible through the opening and a closed position wherein the cover overlies the opening and secures the items therein. The resilient element is integrally molded with the compartment body with the extension portion coupled to the cover. The extension portion may impose a force on the cover to resist movement of the cover away from the open position when the cover is in the open position. The extension portion may also impose a force on the cover to resist movement of the cover away from the closed position when the cover is in the closed position. In this way, a vehicle occupant does not have to hold the cover in the open position when desiring to access the compartment and the cover does not vibrate or pop open when in the closed position due to normal operation of the vehicle.

In another aspect of the invention, an over-center feature may be provided with the automotive compartment. To this end, the cover includes an equilibrium position between the open and closed positions. The extension portion of the resilient element may be configured such that movement of the cover away from the equilibrium position and toward the open position imposes a force on the cover that biases the cover toward the open position. In a likewise manner, movement of the cover away from the equilibrium position and toward the closed position imposes a force on the cover that biases the cover toward the closed position. The equilibrium position may be located, for example, approximately half way between the open and closed positions.

A method of making the automotive compartment includes a two-shot molding process. To this end, a mold assembly is provided wherein a first mold chamber is formed and a first curable material is injected therein to mold a first member as one of the compartment body or the cover during a first shot of the two-shot molding operation. A second mold chamber is then formed about at least a portion of the first member and a second curable material is injected therein to mold a resilient element having an extension portion with the first element during the second shot of the molding operation. The extension portion is then coupled with a second member configured as the other one of the compartment body or the cover and imposes a force on the second member that biases the second member in at least one direction. The second curable material that forms the resilient element may include a thermoplastic elastomer, polypropylene, or other suitable materials known in the art.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
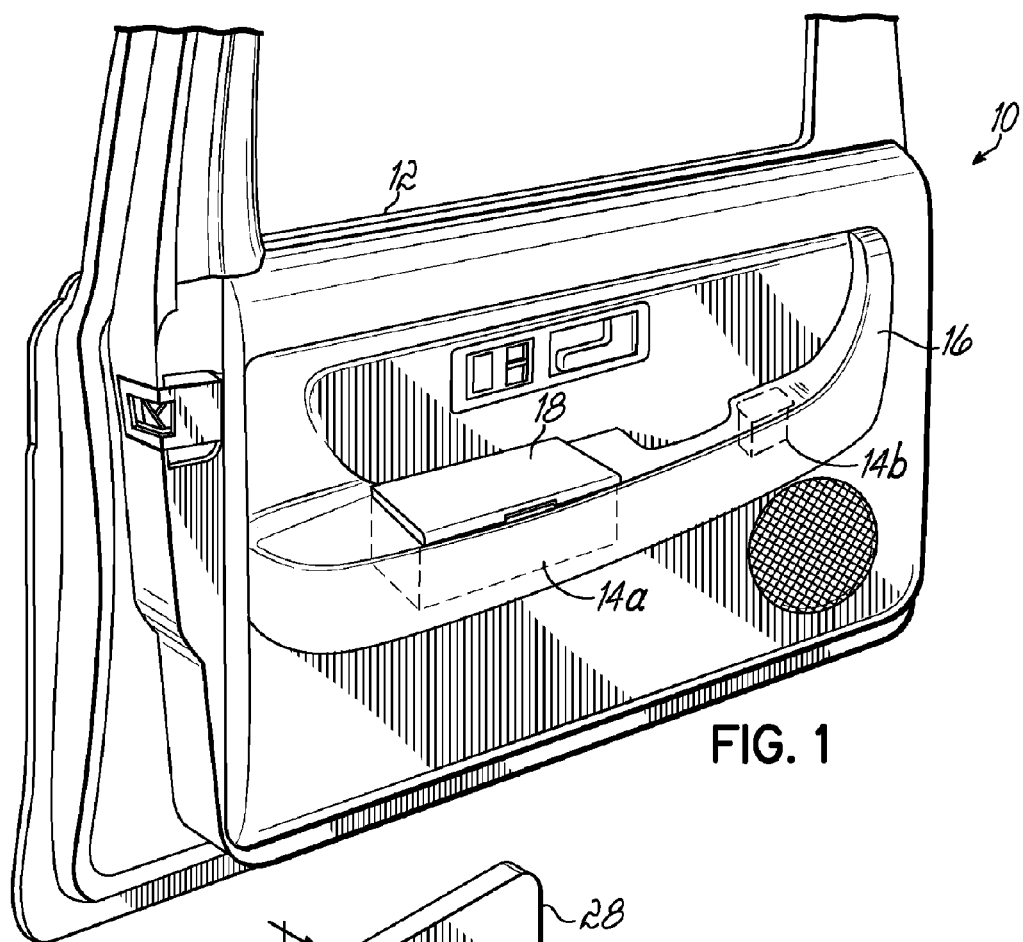
FIG. 1 is a side perspective view of an interior door trim panel including embodiments of the automotive compartment of the present invention.

FIG. 1 shows an interior trim assembly, in the form of a door panel for an automobile door 12, including various embodiments of the automotive compartment, generally shown at 14, of the present invention. For example, the automotive compartment may take the form of a storage compartment 14a or an ashtray 14b within a support 16 of door panel 10. The door panel 10 covers a portion of the interior of the automobile door 12 to provide a more aesthetically pleasing environment, as well as additional comfort to the vehicle's occupants. Other various trim assemblies in the automobile, such as instrument panels, rear passenger side panels and consoles, are generally constructed in a similar fashion and may benefit from the present invention. Thus, while the following detailed description focuses on an automotive compartment 14 being included in a door panel 10, those having ordinary skill in the art will recognize that the compartments, such as storage compartment 14a or ashtray 14b, may equally be incorporated in other automotive trim assemblies.

The door panel 10 includes a support 16 having a relatively rigid substrate, which receives the compartment 14, and which forms at least a portion of the structural support and defines the general shape of the door panel 10. The door panel 10 may be secured to the interior of the automobile door 12, for example, by a bracket or mounting member (not shown) as is known in the art. The door panel 10 further includes a front surface that faces the interior of the automobile and typically includes an aesthetic aspect, and a back surface opposite the front surface that is hidden from view when the door panel 10 is mounted to the automobile door 12. As shown in FIG. 1, compartment 14 may be incorporated into door panel 10 and cooperate with other features, such as armrest 18, to hide the compartment 14 from view.

Figure 2:
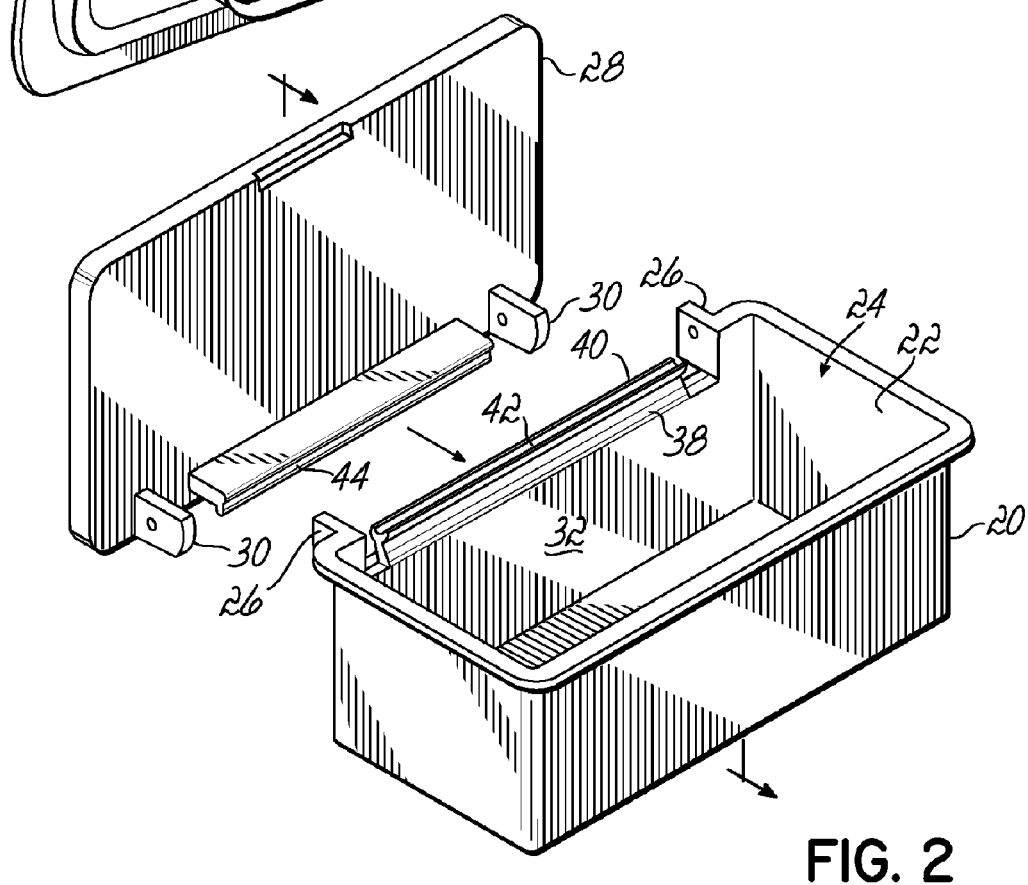
FIG. 2 is a perspective view of one embodiment of the automotive compartment of FIG. 1.

As best shown in FIG. 2, the automotive compartment 14 includes a compartment body 20 defining a cavity 22 having an opening 24 for gaining access to the cavity 22. The cavity 22 is adapted to store one or more items such as coins, tissue, maps, ashes and the like. The compartment body 20 further includes a pair of spaced apart connecting members 26 formed therein. While two connecting members 26 are shown in FIG. 2, it should be understood by those of ordinary skill in the art that one connecting member or more than two connecting members may be formed with the compartment body 20. The compartment body 20 may be made of a thermoplastic material such as a thermoplastic synthetic resin. For example, depending on the particular application, the compartment body 20 may be formed from polybutylene terephthalate, polyamide 12, polycarbonate/acrylonitrile butadiene styrene or other suitable materials known in the art. The automotive compartment 14 also has a cover 28 including two connecting members 30 formed therewith. It similarly should be understood by those having ordinary skill in the art that one connecting member or more than two connecting members may be formed with the cover 28. The cover 28 may be made of a thermoplastic material such as a thermoplastic synthetic resin. For example, depending on the particular application, the cover 28 may be formed from polypropylene, polyoxymethylene, polyamide 6, or other suitable materials.

The cover 28 may be coupled to compartment body 20 by conventional means. For example, the connecting members 26 of the compartment body 20 may cooperate with the connecting members 30 of the cover 28 to couple the cover 28 to the compartment body 20. To this end, a pair of metallic or plastic hinge pins (not shown) may be used to pivotally couple the cover 28 to the compartment body 20. In this way, the cover 28 is moveable between an open position, wherein the cavity 22 is accessible through the opening 24, and a closed position, wherein the cover 28 overlies the opening 24 and secures the various items located within compartment body 20. Those of ordinary skill in the art will recognize many ways to attach the cover 28 with the compartment body 20 that allows the cover 28 to move between the open and closed positions that are within the scope of the invention. For instance, a ball and socket joint may be used to couple the cover 28 with the compartment body 20.

Figure 3A:
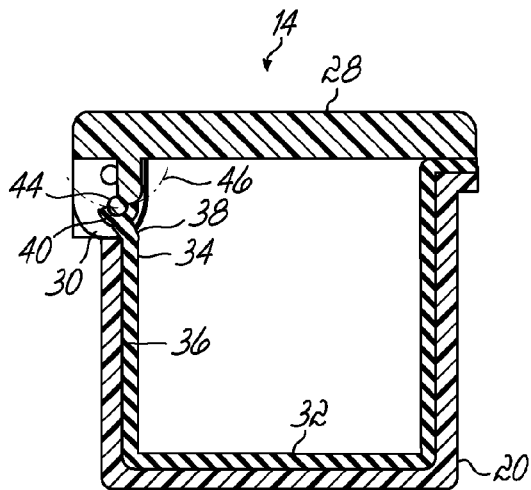
FIGS. 3A–3B are cross-sectional views of the compartment in a closed and partially open position.
Figure 3B:
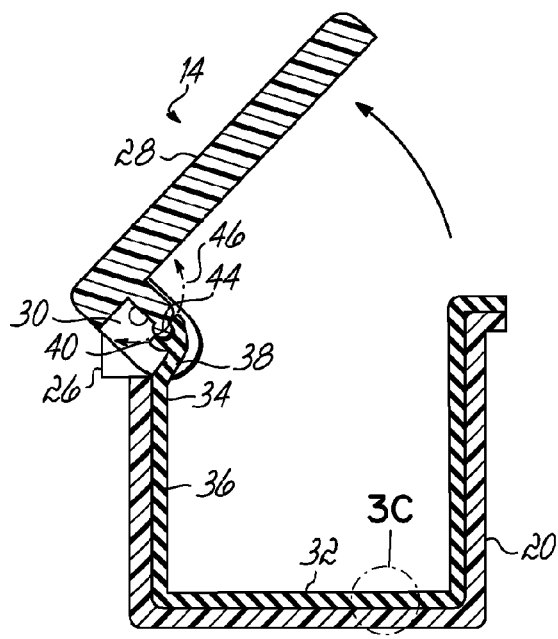
Figure 3C:
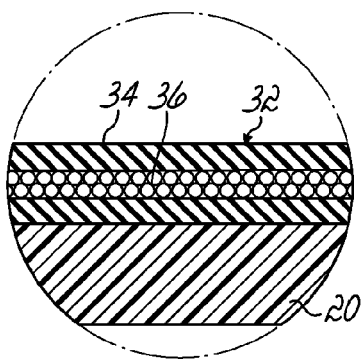
FIG. 3C is an enlarged view of the resilient element showing an outer skin and an inner core.

As shown in FIGS. 3A and 3B, the automotive compartment 14 further includes a resilient element 32 that is integrally molded to compartment body 20. In particular, resilient element 32 is molded with the interior of cavity 22 so as to provide a surface that is soft to the touch, aesthetically pleasing, and prevents the various items stored within compartment 14 from sliding or otherwise moving during normal operation of the vehicle. In this sense, resilient element 32 replaces the rubber mat or flock material that is typically used in previous automotive compartments to achieve essentially the same objective. The resilient element 32 may be made from a polymer material such as a thermoplastic elastomer or a polyolefin, such as polypropylene. For example, a thermoplastic elastomer available from Kraiburg TPE Corp. of Duluth, Ga. may be used to form resilient element 32. As will be explained in more detail below, and as shown in FIG. 3C, the polymer material may be foamed by the addition of a blowing agent to the polymer material so as to form an outer skin layer 34 that has a non-cellular structure and an inner core 36 having a low-density cellular structure. The polymer material may also form an inner skin layer adjacent compartment body 20 that also has a non-cellular structure. In this way, the outer skin 34 provides an attractive, decorative aspect while the inner core 36 provides a soft feel.

In an advantageous aspect of the invention, resilient element 32 includes an extension portion, generally shown at 38, that is integrally formed with resilient element 32. As one of ordinary skill in the art will recognize, more than one extension portion 38 may be provided with resilient element 32. Extension portion 38 includes a free end 40 that is coupled to the cover 28. For example, as shown in FIGS. 2, 3A and 3B, the free end 40 of the extension portion 38 has an opening 42 that is engaged with a nub portion 44 extending from a bottom surface of cover 28. The nub portion 44 may be frictionally secured or alternatively, adhesively secured to opening 42 in extension portion 38. Those of ordinary skill in the art will recognize that other configurations are possible for coupling extension portion 38 with cover 28. For example, the free end 40 of extension portion 38 may include a hole and the cover 28 may include a pair of spaced apart supports. A pin may be inserted through the hole and coupled to the supports so as to secure the extension portion 38 to the cover 28.

The extension portion 38 advantageously operates as the coil springs used in previous automotive compartments. To this end, the extension portion 38 is configured to impose a force on the cover 28 in at least one direction. For instance, in one embodiment of the invention, the extension portion 38 may be configured to impose a force on the cover 28 so as to resist movement of the cover 28 from the open position when the cover 28 is in the open position. In this way, when the compartment 14 is open, a vehicle occupant does not have to use one hand to hold the cover 28 in the open position. The extension portion 38 may also be configured to impose a force on the cover 28 so as to resist movement of the cover 28 from the closed position when the cover 28 is in the closed position. In this way, when the compartment is closed, the cover 28 will not undesirably open or rattle when the vehicle hits a bump or is otherwise traversing rough terrain and may prevent the items in the compartment 14 from popping out or being ejected from the compartment 14.

In another advantageous aspect of the invention, the extension portion 38 may be further configured to provide an over-center feature to the cover 28. The over-center feature essentially provides a snap open and/or a snap closed aspect to the cover 28. To this end, the cover 28 includes an equilibrium position between the open and closed positions. When the cover 28 is in the equilibrium position, the extension portion 38 is at its maximum compressed state thus the extension portion 38 is imposing a force on the cover 28. Furthermore, when the cover 28 is in the equilibrium position, the force from the extension portion 38 is being applied to the cover 28 in a direction that is substantially perpendicular to the traveling path 46 of the free end 40 of extension portion 38 when attached to nub portion 44 of cover 28. In this way, when the cover 28 is in the equilibrium position, the extension portion 38 is not biasing the cover 28 toward either the open or closed positions, as the force is acting substantially perpendicular to the traveling path 46.

When the cover 28 is moved away from the equilibrium position, however, the force caused by the compression of the extension portion 38 causes extension portion 38 to impose a force on cover 28 that is no longer substantially perpendicular to traveling path 46 and consequently biases the cover 28 toward either the open or closed position. When the cover 28 is moved away from the equilibrium position and toward the open position, the extension portion 38 imposes a force on the cover 28 that biases the cover 28 toward the open position. In a likewise manner, when the cover 28 is moved away from the equilibrium position and toward the closed position, the extension portion 38 imposes a force on the cover 28 that biases the cover 28 toward the closed position. The coupling of the extension portion 38 and cover 28 may be configured so as to selectively choose the location of the equilibrium position. For example, the equilibrium position may be located approximately half way between the open and closed positions, though the invention is not so limited.

With reference to FIGS. 4A–4D, a method of making the compartment 14 having an integrated spring mechanism will now be described. In an advantageous aspect of the invention, the method includes a two-shot molding process. A single mold assembly 50 includes spaced-apart first and second members 52 and 54, and a mold core 56 situated between the members 52, 54. The mold core 56 has opposite first and second cavities 58, 60 each adapted to confront and mate with one of a corresponding first and second male portions 62, 64 defined in the members 52, 54. The mold core 56 is adapted to pivot so that the first and second cavities 58, 60 are confronting, in turn, with the first and second male portions 62, 64 to injection mold, in sequence, the first member, i.e., the compartment body 20, then the resilient element 32. While the first and second shots of the injection molding operation are described below with respect to the first cavity 58, it is understood that the first and second shots of the two-shot molding operation may occur in the same fashion with respect to the second cavity 60.

Figure 4A:
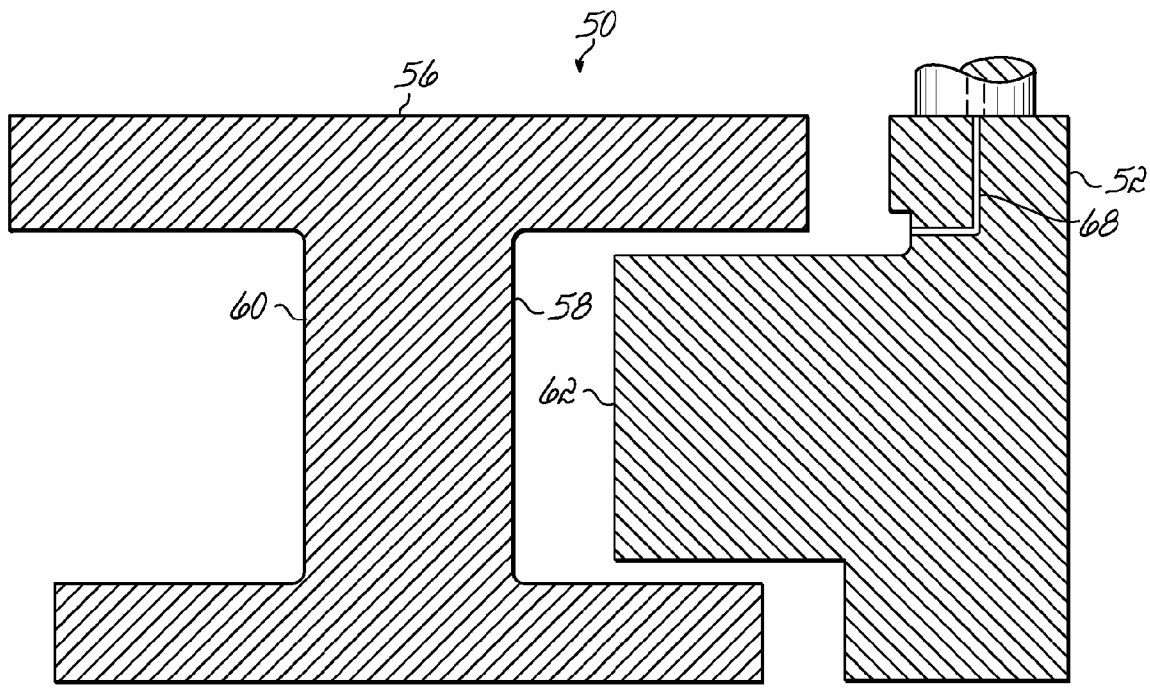
FIGS. 4A–4D are diagrammatic cross-sectional views illustrating a molding process for forming the compartment of the present invention.
Figure 4B:
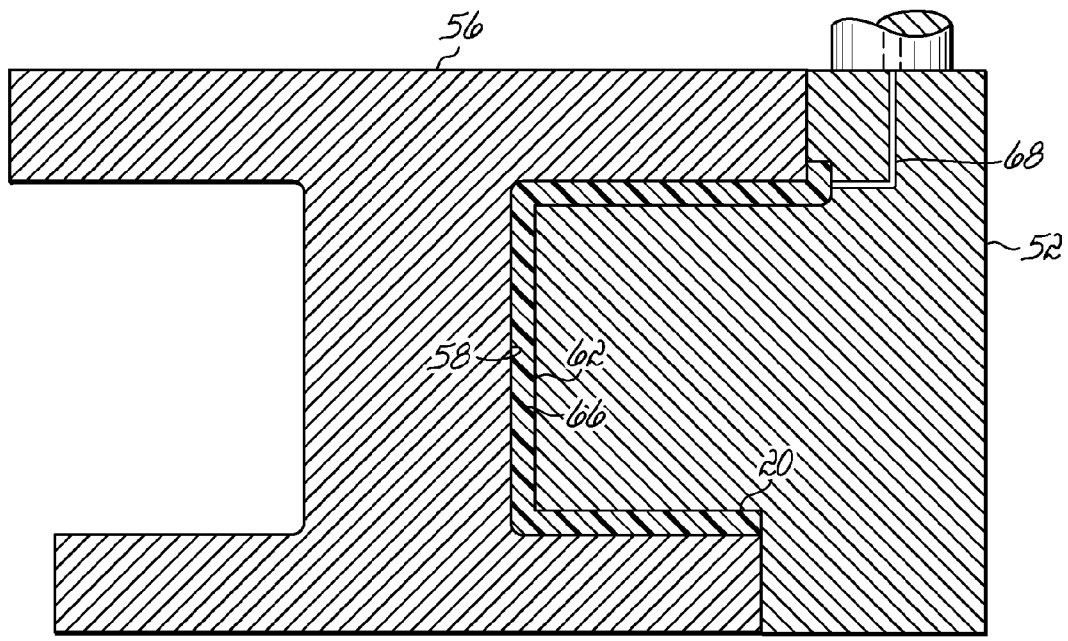

As shown in FIGS. 4A–4B, the first cavity 58 of the mold core 56 is moved into alignment with first male portion 62 and mated with the first member 52 to define a closed first shot mold chamber 66 defined between first cavity 58 and male portion 62. The first shot mold chamber 66 generally defines the shape of the compartment body 20. In a first shot of the molding operation, a first molten polymer suitable for forming compartment body 20 is injected through a channel 68 into mold chamber 66. The first polymer material may be polybutylene terephthalate, polyamide 12, polycarbonate/acrylonitrile butadiene styrene or other suitable materials known in the art.

Figure 4C:
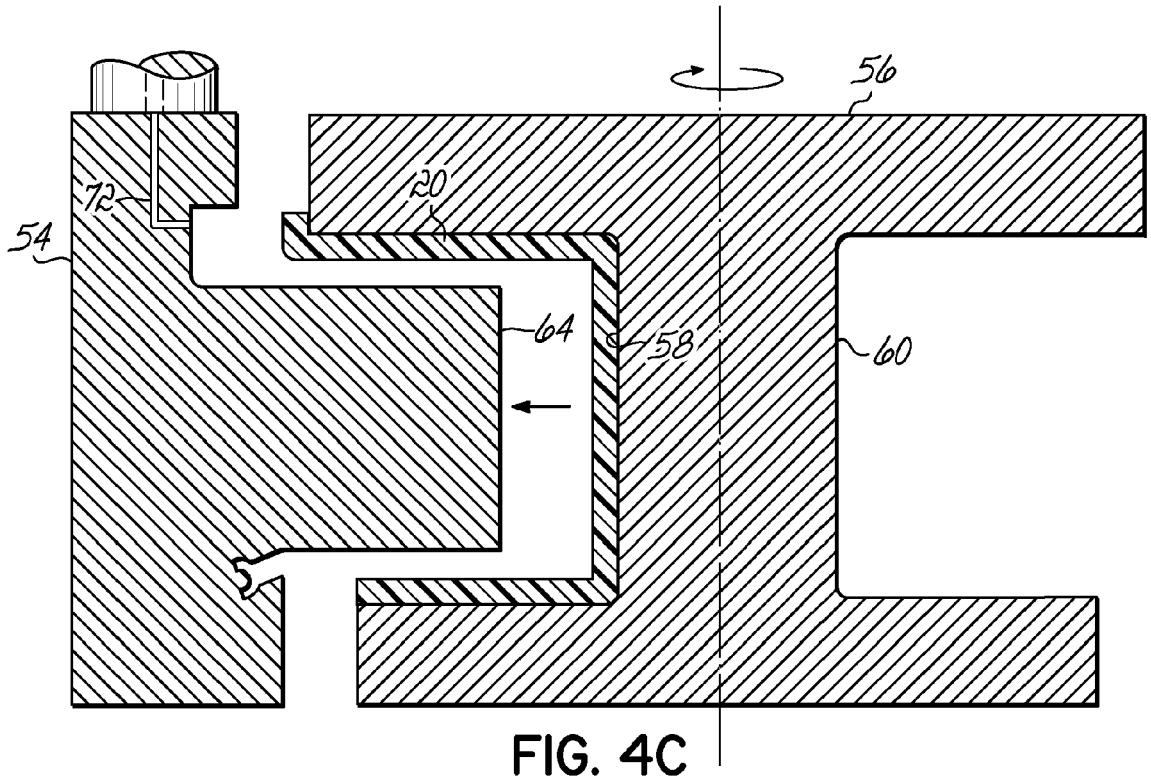
Figure 4D:
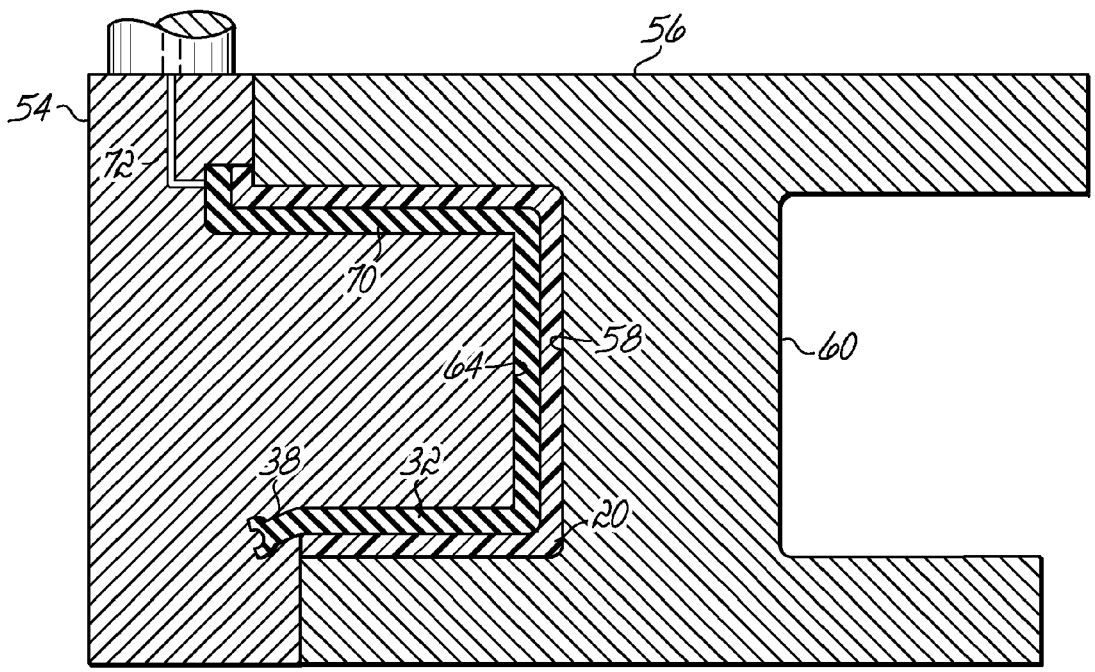

As shown in FIGS. 4B–4D, the first male portion 52 is moved away from the mold core 56 and core 56 is rotated so that the first cavity 58 carrying compartment body 20 confronts and mates with the second male portion 64 to define a closed second shot mold chamber 70 about at least a portion of the compartment body 20. The second shot mold chamber 70 generally defines the shape of resilient element 32 having extension portion 38. In a second shot of the two-shot molding operation, a second molten polymer material having an additive blowing agent mixed therewith is injected through a channel 72 into second mold chamber 70 to form the resilient element 32 having extension portion 38 formed therewith.

In the second shot, the injected molten polymer is activated, or foamed, as is commonly known in the art, by introducing a physical or chemical blowing agent into the molten polymer, generally prior to being injected into mold chamber 70. The blowing agent is advantageously present in an amount from about 0.1% to 5% by weight of mixture, and more advantageously from about 0.1% to 3% by weight. Generally, the blowing agent works by expanding the polymer of inner core 36 to produce a cellular structure having significantly less density than the polymer itself. The blowing agent may be any chemical agent that liberates gas when heated above a characteristic decomposition temperature (e.g. sodium bicarbonate that liberates $CO_2$ when heated above its decomposition temperature), any physical agent such as any gas (e.g. gaseous nitrogen), or any other known blowing agent. As the polymer cools and hardens, gas-filled bubbles originating from the blowing agent define the cellular structure throughout core 36 of a given density. Depending upon the molding conditions, the cell structure of the cured core 36 may either be closed or open. The second polymer material of resilient element 32 may be a thermoplastic polymer like a thermoplastic elastomer or a polyolefin like polypropylene. As the mold 50 is cooled, portions of the molten polymer in contact with the second male portion 64 form the outer skin layer 34 on the exposed surface of the interior of compartment body 20. The skin layer 34 is substantially free of the cells found in core 36 and, therefore have a greater density than the core 36. The thickness of the layer 34 is dependent upon the cooling rate of the surfaces of the molten polymer that are in contact with the second male portion 64. Cooling the molten polymer more rapidly may increase the thickness of the layer 34.

After the compartment body 20 has cooled, the second male portion 64 is moved away from the core 66, and the compartment body 20 is ejected, having resilient element 32 integrally molded thereto, such as by ejector pins (not shown), from the first cavity 58. The two-shot molding process is repeated to form additional compartment bodies 20. Although not illustrated, it is understood that the second cavity 60 also is adapted to confront and mate with the first member 52, during the mating of the first cavity 58 with the second male portion 64, to form a second compartment body (not shown) identical to the first compartment body 20 by injecting molten polymer into the first shot mold chamber defined by cavity 60 and male portion 62 in the first shot of the molding operation. After injection, the mold core 66 is rotated to align the second cavity 60 with second male portion 64 in the second member 54 and mated to define a second shot chamber for the second shot of the molding operation while the first cavity 58 returns to a confronting relationship with first male portion 62 in the first member 52 to repeat the first shot of the molding operation. In this fashion, multiple compartment bodies 20 may be serially formed in a continuous and efficient manner.

Although the method of making utilizes a single mold assembly 50 for a continuous, integrated process, it still should be understood that the molding process may be performed in more than one mold assembly such that the compartment body 20 may be moved from the first shot mold cavity after the first shot to a second shot mold cavity provided in a second, separate mold assembly (not shown) for the second shot of the molding operation. Compartment body 20 or, at the least, resilient element 32 may also be formed by other multi-component molding processes known to those skilled in the art. For example, resilient element 32 may be formed by a co-injection molding process in which two or more molten polymers are sequentially or simultaneously injected into the same mold to form skin 34 and inner cellular core 36.

The second member of the compartment 14, i.e., the cover 28 may be formed in a separate processing step. For example, the cover 28 may be formed through a separate injection molding process. The cover 28 and the compartment body 20 are then coupled so that the cover 28 is moveable with respect to the compartment body 20 between the open and closed positions. For example, the cover 28 may be hingedly attached to the compartment body 20. The extension portion 38 of the resilient element 32 is then coupled to the cover 28 so that the extension portion 38 imposes a force on the cover 28 to bias the cover in at least one direction.

Although the above method has described molding the first member as the compartment body 20 and molding the resilient element 32 onto at least a portion of the compartment body 20, it should be understood that the cover 28, alternatively, could be molded as the first member with the resilient element 32 molded with at least a portion of the cover 28. For example, the resilient element 32 may be molded onto the top surface of the cover 28 so as to function as a padded armrest as well as providing the extension portion 38 that functions as the spring mechanism.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An automotive assembly comprising:
   a first member;
   a second member pivotally coupled to said first member, said second member moveable between a first and second position with respect to said first member; and
   a resilient element made from a polymer material and integrally molded with one of said first member and said second member, said resilient element including at least one extension portion formed therewith and having a free end, said free end coupled to the other one of said first member and said second member, wherein said extension portion is configured to impose a force on said second member to bias said second member in at least one direction.

2. The assembly of claim 1, wherein said extension portion is configured to impose a force on said second member to resist movement of said second member away from said first position when in said first position, and to impose a force on said second member to resist movement of said second member away from said second position when in said second position.

3. The assembly of claim 1, wherein said first member is a compartment body defining a cavity having an opening and said second member is a cover, said first position being an open position wherein said cavity is accessible through said opening and said second position being a closed position wherein said cover overlies said opening.

4. The assembly of claim 1, wherein said second member includes an equilibrium position between said first and second positions, said extension portion further configured such that movement of said second member away from said equilibrium position and toward said first position imposes a force on said second member that biases said second member toward said first position, and movement of said second member away from said equilibrium position and toward said second position imposes a force on said second member that biases said second member toward said second position.

5. The assembly of claim 4, wherein said first member is a compartment body defining a cavity having an opening and said second member is a cover, said first position being an open position wherein said cavity is accessible through said opening and said second position being a closed position wherein said cover overlies said opening.

6. The assembly of claim 4, wherein said equilibrium position is approximately half way between said first and second positions.

7. The assembly of claim 1, wherein said resilient element is made from a material selected from the group consisting of a thermoplastic elastomer and polypropylene.

8. An automotive interior trim assembly, comprising:
   a support; and
   a compartment coupled to said support and adapted to store one or more items, said compartment comprising:
      a compartment body defining a cavity adapted to store the one or more items and having an opening for gaining access to said cavity;
      a cover coupled to said compartment body and moveable between an open position, wherein said cavity is accessible through said opening, and a closed position, wherein said cover overlies said opening; and
      a resilient element made from a polymer material and integrally molded with one of said compartment body and said cover, said resilient element including at least one extension portion formed therewith and having a free end, said free end coupled to the other one of said compartment body and said cover, wherein said extension portion is configured to impose a force on said cover to bias said cover in at least one direction.

9. The trim assembly of claim 8, wherein said extension portion is configured to impose a force on said cover to resist movement of said cover away from said open position when in said open position, and to impose a force on said cover to resist movement of said cover away from said closed position when in said closed position.

10. The trim assembly of claim 8, wherein said cover includes an equilibrium position between said open and closed positions, said extension portion further configured such that movement of said cover away from said equilibrium position and toward said open position imposes a force on said cover that biases said cover toward said open position, and movement of said cover away from said equilibrium position and toward said closed position imposes a force on said cover that biases said cover toward said closed position.

11. The trim assembly of claim 10, wherein said equilibrium position is approximately half way between said open and closed positions.

12. The trim assembly of claim 8, wherein said resilient element is molded to the compartment body.

13. The trim assembly of claim 8, wherein said resilient element is molded to the cover.

14. The trim assembly of claim 8, wherein said resilient element is made from a material selected from the group consisting of a thermoplastic elastomer and polypropylene.

15. The trim assembly of claim 8 configured as an automotive storage compartment.

16. The trim assembly of claim 8 configured as an automotive ashtray.

17. A method of making a compartment for an automotive trim assembly, comprising:
   forming a first mold chamber;
   molding a first member as one of a compartment body and a cover by injecting into the first mold chamber a first curable material in a first shot of a molding operation;
   forming a second mold chamber about at least a portion of the first member;
   molding a resilient element having an extension portion with the first member by injecting into the second mold chamber a second curable material in a second shot of the molding operation; and
   coupling the extension portion of the resilient element with a second member configured as the other one of the compartment body and the cover, wherein the extension portion imposes a force on the second member to bias the second member in at least one direction.

18. The method of claim 17 further comprising:
   molding the second member as the other one of the compartment body and the cover; and
   coupling the first member with the second member so that the second member is moveable with respect to the first member.

19. The method of claim 18, wherein molding the first member comprises molding the compartment body and molding the second member comprises molding the cover.

20. The method of claim 17, wherein the second curable material is selected from the group consisting of a thermoplastic elastomer and polypropylene.

* * * * *